US012596082B2

(12) United States Patent
　　Goran

(10) Patent No.: US 12,596,082 B2
(45) Date of Patent: Apr. 7, 2026

(54) PROXIMITY SENSOR FOR ELECTRON BACKSCATTER DIFFRACTION SYSTEMS

(71) Applicant: Bruker Nano GmbH, Berlin (DE)

(72) Inventor: Daniel Radu Goran, Berlin (DE)

(73) Assignee: BRUKER NANO GMBH, Berlin (DE)

( * ) Notice: Subject to any disclaimer, the term of this patent is extended or adjusted under 35 U.S.C. 154(b) by 370 days.

(21) Appl. No.: 18/532,965

(22) Filed: Dec. 7, 2023

(65) Prior Publication Data

US 2024/0241066 A1　　Jul. 18, 2024

(30) Foreign Application Priority Data

Jan. 13, 2023　　(EP) ..................................... 23151547

(51) Int. Cl.
　　*G01N 23/203*　　(2006.01)
(52) U.S. Cl.
　　CPC ................................. *G01N 23/203* (2013.01)
(58) Field of Classification Search
　　USPC ................................................. 250/310, 397
　　See application file for complete search history.

(56) References Cited

U.S. PATENT DOCUMENTS

| | | | |
|---|---|---|---|
| 2020/0096458 A1 | 3/2020 | Kucharczyk | |
| 2021/0025837 A1* | 1/2021 | Goran ..................... | H01J 37/28 |
| 2024/0047174 A1* | 2/2024 | Rossek ................. | H01J 37/244 |

OTHER PUBLICATIONS

Extended European Search Report of EP 23151547.9, Jun. 15, 2023, 7 pages.

* cited by examiner

*Primary Examiner* — Kiet T Nguyen
(74) *Attorney, Agent, or Firm* — Lewis Roca Rothgerber Christie LLP

(57)　　　　　　ABSTRACT
The present invention refers to a proximity sensor for electron backscatter diffraction (EBSD) systems, particularly, a proximity sensor for collision avoidance between an EBSD sensor of an EBSD system and a stage of a scanning electron microscope (SEM) equipped with the EBSD system, and a corresponding method for proximity monitoring. The proximity sensor comprises emitter(s) to provide a light beam or light curtain which is basically directed parallel to an active area of the EBSD sensor and transmitted across the active area of the EBSD sensor at a distance selected as an alerting distance for the proximity sensor during collision monitoring; and receiver(s) located opposite to the emitter with respect to the active area of the EBSD sensor, configured to detect the light beam or light curtain and to provide a signal corresponding to the intensity of the light beam or light curtain for collision monitoring.

10 Claims, 1 Drawing Sheet

PROXIMITY SENSOR FOR ELECTRON BACKSCATTER DIFFRACTION SYSTEMS

CROSS-REFERENCE TO RELATED APPLICATION

This application claims priority to European Patent Application No. 23151547.9, filed on Jan. 13, 2023, the entire content of which is incorporated herein by reference.

FIELD

The present invention refers to a proximity sensor for electron backscatter diffraction (EBSD) systems, particularly to an improved proximity sensor for collision avoidance between an EBSD sensor of an EBSD system and a stage of a scanning electron microscope (SEM) equipped with the EBSD system. The invention further refers to a corresponding method for proximity monitoring.

TECHNOLOGICAL BACKGROUND AND PRIOR ART

EBSD is a phenomenon that can be typically observed in a SEM when the electron beam is scanned across the surface of a tilted sample. The electrons diffracted by the sample form a pattern that can be detected by an EBSD detector and which then may be electronically analysed. Because the produced patterns depend on the orientation of crystals forming the microstructure of a sample, EBSD is widely used for the characterisation of crystalline materials. By analysing the formed patterns at different locations across the sample surface and transferring the results in a corresponding crystallographic model, the microstructure of the sample can be resolved with high resolution. An EBSD-based material analysis system can be simply integrated in a SEM setup and allows a fast and efficient microstructural characterisation of samples.

In EBSD systems, special EBSD detectors are used for capturing the diffracted electrons that contain the microstructural information of the sample. Conventional EBSD detectors use a scintillator for transforming the electron signal into a photon signal which is then captured using off-the-shelf CCD or CMOS cameras positioned behind the scintillator. Modern CCD-based or CMOS-based EBSD system combine a high spatial resolution with fast detection, such that information rich microstructural maps can be generated in very short times. For a fast and efficient capturing process, the sample has to be positioned very close in front of the active area of the EBSD sensor. However, the active area of an EBSD sensor is very delicate and easily damaged. Any collision between the sample and the active surface must therefore be avoided, since the whole EBSD detector may have to be replaced in most cases after a serious incident.

Collision sensors or proximity sensors are typically used for collision monitoring or avoidance, with proximity sensors being preferred over collision sensors. By helping to avoid collisions well in advance, proximity sensors provide full protection also against minor damage (produced by a gentle touch) and not only against major damage resulting, for example, from the collision of the SEM stage with the EBSD detector. This is critically important for EBSD detectors using a direct detection method since the economic damage (repair and down time) inflicted by a collision with the active area can be at least two orders of magnitude higher as compared to a scintillator of scintillator-based EBSD detector that is simply user replaceable and can be stored as spare part for nearly indefinite long times.

While there is no major manufacturing cost difference between the two monitoring systems, the collision sensors have the advantage that they are very robust and reliable in that they do not interfere with the measurements performed by various instruments and are not affected by any other signals present in the SEM chamber. On the other hand, capacitive proximity sensors have to be switched off when the electron beam is present to avoid affecting the beam focus and stability. This leaves the detector unprotected while giving a less experienced operator the false impression that the detector is safe no matter how the SEM stage actually moves.

It is thus an object of the present invention to overcome or reduce at least some of the disadvantages of the prior art and to provide an improved proximity sensor for collision avoidance between an EBSD detector of an EBSD system and an object or a stage of a SEM equipped with the EBSD system. The solution described by the present invention combines the robustness and reliability of conventional collision sensors with the preferred collision avoidance capabilities of proximity sensors, allows continuous monitoring even when the electron beam is present in the SEM chamber and does not interfere with the operation of other detectors present inside the SEM chamber.

DESCRIPTION OF THE INVENTION

The objective of the invention is solved and the disadvantages of the prior art are overcome, at least partially, by a photoelectric proximity sensor of claim 1 and a corresponding method of claim 9 for proximity monitoring with a photoelectric proximity sensor of the present invention. The dependent claims are directed to preferred embodiments of the present invention.

An aspect of the invention relates to a photoelectric proximity sensor for EBSD systems which include an EBSD sensor having an active area configured for facing an object located in front of the EBSD sensor, comprising at least one emitter configured to provide a light beam or light curtain which is basically directed parallel to the active area of the EBSD sensor and passing across (i.e., in front of/above) the active area of the EBSD sensor at a distance selected as an alerting distance for the proximity sensor during collision monitoring; and at least one receiver located opposite to the emitter with respect to the active area of the EBSD sensor, configured to detect the light beam or light curtain and to provide a signal (i.e., a proximity alert signal) corresponding to the intensity of the light beam or light curtain for collision monitoring/avoidance.

A proximity sensor according to the present invention is thus based on a photoelectric measurement principle implementing a photoelectric barrier into the head of an EBSD sensor for collision avoidance purposes. The proximity sensor is to protect the sensitive active surface of the EBSD sensor which is facing an object located in front of the EBSD sensor. The object that may cause damage to the active surface can be, for example, a part of a sample or of a stage of a SEM in which the EBSD system is installed.

The at least one emitter is configured to provide a light beam or light curtain. The emitters may be laser diodes, LEDs or any other suitable illumination devices, e.g., an end of optical fibres that can be illuminated by the optical fibres. The emitters may provide a light beam preferably with an essentially flat beam profile (e.g., from a line laser or elliptical laser with high aspect ratio). This specific beam profile may be provided, for example, by the emitters itself, by using a diffractive optical element (DOE) for a respective beam shaping, or by placing the emitters inside a narrow groove to control the beam spread angle and avoid having light reaching the active area of the EBSD detector. A light curtain is simply understood as a more general realisation of such an arrangement. A light curtain may be "woven" by intersecting a large number of individual light beams which may form a photoelectric barrier net instead of a single continuous light beam covering at least a part of the active area of the EBSD sensor. However, a single light beam with the described properties may also be interpreted as a light curtain which has an "infinitely" dense mesh spacing.

The light beam or light curtain is basically directed parallel to the active area of the EBSD sensor and transmitted across the active area of the EBSD sensor at a distance selected as an alerting distance for the proximity sensor during collision monitoring. In the case of an ideal line shaped beam profile having a fan angle (due to divergence) and that extends its beam diameter across the active surface of the EBSD sensor (fast axis), a planar alerting zone (or detection zone) is formed. With a more elliptical beam profile as described above, the light beam or light curtain may already have a substantial thickness in the monitored distance direction above the active surface.

The light beam or light curtain is detected by at least one receiver located opposite to the at least one emitter with respect to the active area of the EBSD sensor. The at least one detector is configured to provide a signal corresponding to the intensity of the light beam or light curtain for collision monitoring.

In a preferred embodiment of the present invention, the proximity sensor further comprises an evaluation and signalling module, configured to evaluate the signal of the at least one detector for collision monitoring and signalling a proximity alert when the object is approaching the active area of the EBSD sensor at a distance equal or less than the alerting distance. A part of the object that interrupts a direct beam path between the at least one emitter and the at least one receiver may start to increasingly block some parts of the light beam or a light curtain above the EBSD sensor. The at least one receiver may thus detect a decrease of the received light intensity and a proximity alert may be given. In another exemplary embodiment, a proximity alert may only be given if no light from the light beam or light curtain is detected by the receiver anymore. A proximity alert may be signalled to an operator or to other electronic systems of the EBSD system, e.g., a controller of the motorized insertion/retraction mechanism of the EBSD system.

Preferably, when an object is detected in close proximity to the active area of the EBSD sensor, the proximity sensor may be configured to activate a detector retraction routine at maximum speed. Alternatively, the SEM stage and/or the object may be stopped or retracted in the opposite direction. Such a configuration is also referred to as a collision avoidance system for EBSD systems which include an EBSD sensor having an active area configured for facing an object located in front of the EBSD sensor.

In a preferred embodiment of the present invention, the light beam or light curtain has a spectrum that is monochromatic or that has a spectral bandpass characteristic. Preferably, the at least one receiver is sensitive to the spectrum of the light beam or light curtain, and essentially insensitive to other expected light signals in the environment of the proximity sensor. This may be required because when using photoelectric proximity sensors in an SEM environment, similar problems as with conventional capacitive proximity sensors described above may arise. Other optical signals like infrared light used by the SEM camberscope to illuminate the SEM chamber may interfere with the receivers' capacity to detect the presence of an object in the planar alerting zone of the photoelectric proximity sensor and that again may force the operator to switch off one of the two systems.

This can be avoided when the at least one receiver is (preferably only) sensitive to the spectrum of the light beam or light curtain, and essentially insensitive to other expected light signals in the environment of the proximity sensor. Due to the controlled environment in a SEM chamber, the operator may exactly know which parts of the optical spectrum may interfere with the proximity sensor. To reduce interfere with these other signals, the light beam or light curtain may be selected to have a spectrum that is monochromatic or that has a spectral bandpass characteristic. Preferably, the spectrum of the light beam or light curtain is selected distant from the spectra of the other expected light signals in the environment of the proximity sensor. Such a selection can be made, for example, by using additional filter elements in front of the emitters or by directly using appropriate light sources for the emitters.

For avoiding the other signals interfering with the proximity sensor, the at least one receiver may be sensitive to the spectrum of the light beam or light curtain, and essentially insensitive to other expected light signals in the environment of the proximity sensor. This separation may only be possible if the respective spectra are separated unless further adjustments have been made for a separation of (partly) overlapping spectra.

In a preferred embodiment of the present invention, the light beam or light curtain is an invisible light beam or light curtain. The used invisible light (i.e., light that is not visible to the human eye) may be infrared light. Infrared light is typically used for light barriers as it does not interfere with visual light. However, in an SEM environment further infrared signals may be present and the infrared spectrum of the light beam or light curtain may have to be selected in view of these other signals to minimize signal interference.

In a preferred embodiment of the present invention, the proximity sensor further comprises a modulator configured to spectrally or intensity modulate the emission of the at least one emitter to impose a detectable characteristic pattern on the emitted light beam or light curtain. A modulation allows to impose a characteristic pattern on the emitted light beam or light curtain even when other signals in the SEM environment are spectrally overlapping. Due to the modulation, a light signal detected by the at least one receiver can be directly assigned to the proximity sensor. The modulation may be an intensity modulation or a frequency modulation that is resolvable by the at least one receiver of the proximity sensor.

In a preferred embodiment of the present invention, the proximity sensor further comprises a demodulator configured to detect the characteristic pattern in the signal of the at least one detector. For assigning a light signal detected by receiver to the proximity sensor, a demodulator may be required to identify the characteristic pattern imposed on the emitted light beam or light curtain. The demodulator can be a lock-in amplifier which may be supplied with a reference signal directly from the modulator. In the case of a spectral modulation of the emission of the at least one emitter, an intensity signal corresponding to the actual wavelength of the light beam or light curtain may be provided by the at least one receiver (spectrally resolving receiver) and being referenced by the modulation signal provided to the emitter.

In a preferred embodiment of the present invention, a proximity alert is signalled based on the detected characteristic pattern when an object is approaching the active area of the EBSD sensor at a distance equal or less than the alerting distance. The proposed proximity sensor imposing a detectable characteristic pattern on the emitted light beam or light curtain thus allows a distinct collision monitoring even in cases where other signals in the SEM chamber are spectrally overlapping the light used by the proximity sensor according to the present invention. The proposed optical proximity sensor thus becomes insensitive to "parasitic" light signals in the SEM chamber. The signal produced by the emitter could add-up to whatever parasitic light there is in the SEM chamber but the predefined characteristic pattern would be recognizable from that background.

In a preferred embodiment of the present invention, the signal comprises multiple signals or is a sum signal of a series of receivers, each located at a distance from one another and arranged at an edge or around the active area of the EBSD sensor, and configured to detect at least a part of the emitted light beam or light curtain.

In a preferred embodiment of the present invention, a background signal is detected and subtracted from the signal of the at least one detector. The proximity sensor can thus be made even more robust, because, by acquiring a signal background with the at least one emitter when it is switched off and subtracting this signal background from the raw signal measured by the at least one receiver when the emitter is activated, the signal-to-noise ratio can be increased.

A photoelectric proximity sensor according to the present invention may thus combine at least one emitter on one side of a EBSD detector head and multiple receivers (e.g., silicon diodes) aligned along an edge or at least a part of the perimeter of the detector head. Each receiver may be connected to a corresponding or common controller through individual lines or by a single collection line. A controller may check the signal diagram from each receiver and may compare it with a predefined characteristic pattern imposed on light beam or light curtain. If one signal (or more) does not match the characteristic pattern, e.g., the optical path is interrupted by an object placed in the direct beam path between the respective combination of emitter and receiver, a detector retraction routine at maximum speed may be triggered. Alternatively, the SEM stage and/or the object may be stopped or retracted.

Another aspect of the invention relates to a method for proximity monitoring using a proximity sensor according to the present invention for EBSD systems which include an EBSD sensor having an active area configured for facing a moveable object located in front of the EBSD sensor, comprising the steps of providing a light beam or light curtain which is basically directed parallel to the active area of the EBSD sensor and transmitted across the active area of the EBSD sensor at a distance selected as an alerting distance for the proximity sensor during collision monitoring; detecting the light beam or light curtain and providing a signal corresponding to the intensity of the light beam or light curtain; and evaluating the signal for collision monitoring and signalling a proximity alert when an object is approaching the active area of the EBSD sensor at a distance equal or less than the alerting distance.

The proposed method for proximity monitoring is directly related to an above-described proximity sensor according to the present invention, therefore the defined steps are also directly related to the individual features of a proximity sensor according to the present invention. Thus, further method steps can be directly and unambiguously derived from the above description of individual features of a proximity sensor according to the present invention. The advantages of the individual features listed there also result in a corresponding manner for the respective method steps.

All embodiments described in this specification may be advantageously combined with one another to the extent that their respective features are compatible. In particular, the expression "in an embodiment" means that the respective features may or may not be part of specific embodiments of the invention.

Further aspects and preferred embodiments of the present invention result from the dependent claims, the drawings and the following description of the drawings. Different disclosed embodiments are advantageously combined with each other if not stated otherwise.

DESCRIPTION OF THE DRAWINGS

The features of the invention become apparent to those skilled in the art by the detailed description of exemplary embodiments with reference to the attached drawings in which.

DETAILED DESCRIPTION OF THE INVENTION

Figure 1:
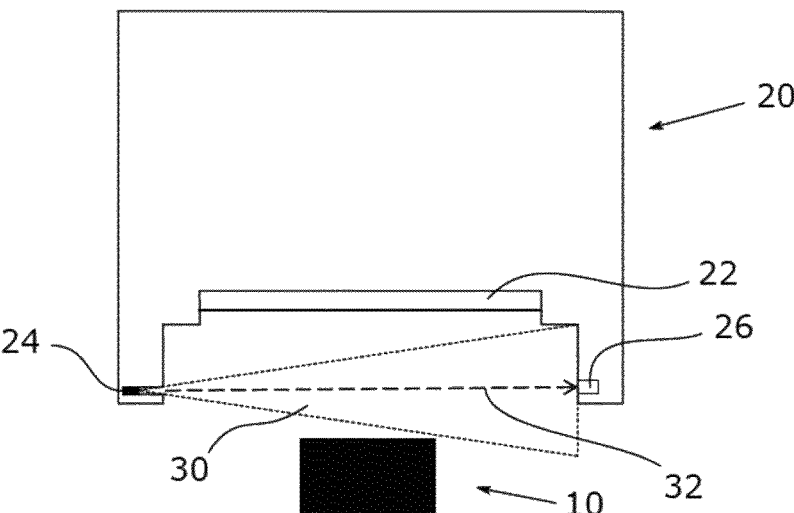
FIG. 1 schematically illustrates a longitudinal section of a top view of an EBSD detector head including an exemplary embodiment of a proximity sensor according to the present invention.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art.

Accordingly, processes, elements, and techniques that are not considered necessary to those having ordinary skill in the art for a complete understanding of the aspects and features of the present invention may not be described.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. Expressions such as "at least one of," when preceding a list of elements, modify the entire list of elements and do not modify the individual elements of the list.

It will be further understood that although the terms "top view" and "side view" are used to describe different views of the claimed device, these terms should not limit the possible orientations of the device. These terms are only used to distinguish one view from another view. For example, depending on the orientation of the device, a top view may be named a side view or a bottom view and, similarly, a side view may be named a top view or a bottom view, without departing from the scope of the present invention. The same stands for relative directional terms like "in front of", "behind", "above" or "below".

As used herein, the term "substantially", "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centred on the value.

FIG. 1 schematically illustrates a longitudinal section of a top view of an EBSD detector head 20 including an exemplary embodiment of a proximity sensor according to the present invention. The EBSD detector head 20 includes an EBSD sensor 22, wherein the active area of the EBSD sensor 22 is facing an exemplarily object 10 (e.g., a part of a sample or the stage of a SEM) positioned directly in front of the EBSD detector head 20. The shown proximity sensor comprises a single emitter 24 configured to provide a light beam or light curtain 30 which is basically directed parallel to the active area of the EBSD sensor 22 and transmitted across the active area of the EBSD sensor 22 at a distance selected as an alerting distance for the proximity sensor during collision monitoring. The shown proximity sensor further comprises at least one receiver 26 located opposite to the emitter 24 with respect to the active area of the EBSD sensor 22, configured to detect the light beam or light curtain 30 and to provide a signal corresponding to the intensity of the light beam or light curtain 30 for collision monitoring. Preferably, a line of receivers 26 is aligned in a vertical direction (into the figure plane). The emitter 24 is located inside a narrow groove (e.g., horizontally) to control the beam spread angle and avoid having light reaching the active area of the EBSD sensor 22.

When the object 10 is approaching the active area of the EBSD sensor 22 at a distance equal or less than the alerting distance, a part of the object interrupting a direct beam path 32 between the emitter 24 and the receiver 26 may start to increasingly block some parts of the light beam or a light curtain 30 above EBSD sensor 22. The at least one receiver 26 may thus detect a decrease of the received light intensity and a proximity alert may be given. In another exemplary embodiment, a proximity alert may only be given if no light from the light beam or light curtain 30 is detected by the receiver 26 anymore. When an object is detected in close proximity to the active area of the EBSD sensor 22, the proximity sensor according to the present invention may be configured to activate a detector retraction routine at maximum speed Alternatively, the SEM stage and/or the object may be retracted or stopped.

Figure 2:
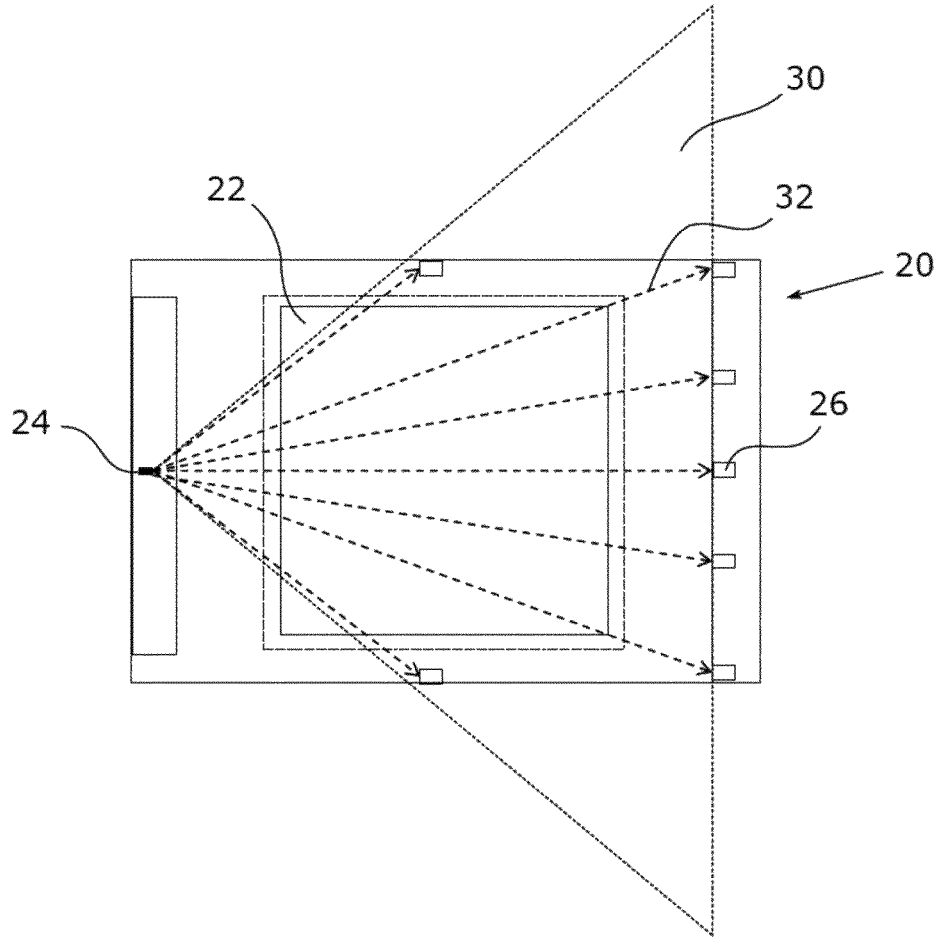
FIG. 2 schematically illustrates a front view of an EBSD detector head including an exemplary embodiment of a proximity sensor according to the present invention.

FIG. 2 schematically illustrates a front view of an EBSD detector head including an exemplary embodiment of a proximity sensor according to the present invention. The shown EBSD detector head 20 may be the EBSD detector head 20 shown as a longitudinal section of a top view in FIG. 1. However, the reference numerals and the respective features they denote directly correspond to the FIG. 1 in any case and thus apply accordingly. The present figure view shows the full active area of the EBSD sensor 22 at the front of the EBSD detector head 20 which is located behind the light beam or a light curtain 30 provided by the single emitter 24. However, a further emitter 24 or a series of emitters 24 may be used instead of a single emitter 24. The light beam or light curtain 30 is then detected by a series of receivers 26, each located at a distance from one another and arranged at an edge or around the active area of the EBSD sensor 22, and configured to detect at least a part of the emitted light beam or light curtain 30. For each of the receivers 26, a direct beam path 32 between the emitter 24 and the respective receiver 26 is drawn.

REFERENCE LIST

10 Object
20 EBSD detector head
22 EBSD sensor 22
24 Emitter
26 Receiver
30 Light beam or light curtain
32 Direct beam path

The invention claimed is:

1. Proximity sensor for electron backscatter diffraction, EBSD, systems which include an EBSD sensor (22) having an active area configured for facing an object (10) located in front of the EBSD sensor (22), comprising:

at least one emitter (24) configured to provide a light beam or light curtain (30) which is basically directed parallel to the active area of the EBSD sensor (22) and transmitted across the active area of the EBSD sensor (22) at a distance selected as an alerting distance for the proximity sensor during collision monitoring; and at least one receiver (26) located opposite to the emitter (24) with respect to the active area of the EBSD sensor (22), configured to detect the light beam or light curtain (30) and to provide a signal corresponding to the intensity of the light beam or light curtain (30) for collision monitoring.

2. Proximity sensor of claim 1, further comprising an evaluation and signalling module, configured to evaluate the signal of the at least one receiver (26) for collision monitoring and signalling a proximity alert when the object (10) is approaching the active area of the EBSD sensor (22) at a distance equal or less than the alerting distance.

3. Proximity sensor of claim 1, wherein the light beam or light curtain (30) has a spectrum that is monochromatic or that has a spectral bandpass characteristic, and wherein the at least one receiver (26) is sensitive to the spectrum of the light beam or light curtain (30), and essentially insensitive to other expected light signals in the environment of the proximity sensor.

4. Proximity sensor of claim 1, wherein the light beam or light curtain (30) is an invisible light beam or light curtain (30).

5. Proximity sensor of claim 1, further comprising a modulator configured to spectrally or intensity modulate the emission of the at least one emitter (24) to impose a detectable characteristic pattern on the emitted light beam or light curtain (30).

6. Proximity sensor of claim 5, further comprising a demodulator configured to detect the characteristic pattern in the signal of the at least one receiver (26).

7. Proximity sensor of claim 5, wherein a proximity alert is signalled based on the detected characteristic pattern when an object is approaching the active area of the EBSD sensor (22) at a distance equal or less than the alerting distance.

8. Proximity sensor of claim 1, wherein the signal comprises multiple signals or is a sum signal of a series of receivers (26), each located at a distance from one another and arranged at an edge or around the active area of the EBSD sensor (22), and configured to detect at least a part of the emitted light beam or light curtain (30).

9. Proximity sensor of claim 1, wherein a background signal is detected and subtracted from the signal of the at least one receiver (26).

10. Method for proximity monitoring using a proximity sensor of claim 1 for electron backscatter diffraction, EBSD, systems which include an EBSD sensor (22) having an active area configured for facing a moveable object (10) located in front of the EBSD sensor (22), comprising the steps:

providing a light beam or light curtain (30) which is basically directed parallel to the active area of the EBSD sensor (22) and transmitted across the active area of the EBSD sensor (22) at a distance selected as an alerting distance for the proximity sensor during collision monitoring;

detecting the light beam or light curtain (30) and providing a signal corresponding to the intensity of the light beam or light curtain (30); and evaluating the signal for collision monitoring and signalling a proximity alert when an object is approaching the active area of the EBSD sensor (22) at a distance equal or less than the alerting distance.

\* \* \* \* \*